United States Patent
McDonald

(12) 
(10) Patent No.: US 6,289,590 B1
(45) Date of Patent: Sep. 18, 2001

(54) METHOD OF FORMING A BEARING

(75) Inventor: Julie Ann McDonald, Rugby (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/297,791

(22) PCT Filed: Oct. 15, 1997

(86) PCT No.: PCT/GB97/02846

§ 371 Date: May 6, 1999

§ 102(e) Date: May 6, 1999

(87) PCT Pub. No.: WO98/20264

PCT Pub. Date: May 14, 1998

(30) Foreign Application Priority Data

Nov. 6, 1996 (GB) .................................................. 9623052

(51) Int. Cl.$^7$ .................................................. B21D 53/10
(52) U.S. Cl. .................................. 29/898.13; 29/898.14; 384/908
(58) Field of Search .......................... 29/898.1, 898.056, 29/898.047, 898.059, 898.13, 898.14, 898; 384/300, 908, 276

(56) References Cited

U.S. PATENT DOCUMENTS

| | | | | |
|---|---|---|---|---|
| 2,750,350 | * | 6/1956 | Kroll ................... | 260/29.6 |
| 3,088,941 | * | 5/1963 | Uhland ................. | 260/92.1 |
| 3,607,878 | * | 9/1971 | Grimaud ............... | 260/29.6 |
| 3,896,071 | * | 7/1975 | Poirer .................. | 260/29.6 F |
| 4,038,230 | * | 7/1977 | Mueller et al. ......... | 260/29.6 F |
| 4,038,244 | * | 7/1977 | Orden et al. .......... | 260/42.16 |
| 4,104,225 | * | 8/1978 | Conbere ............... | 260/29.6 F |
| 4,674,164 | * | 6/1987 | McCloskey ............ | 29/149.5 B |
| 4,685,184 | * | 8/1987 | Satkamp ............... | 29/148.4 R |
| 4,732,818 | * | 3/1988 | Pratt et al. ........... | 428/547 |
| 4,865,922 | * | 9/1989 | Davies ................. | 428/551 |
| 5,688,836 | * | 11/1997 | Yamamoto et al. ..... | 521/145 |
| 5,911,514 | * | 6/1999 | Davies et al. ......... | 384/300 |

FOREIGN PATENT DOCUMENTS

| | | | | |
|---|---|---|---|---|
| 0 412 238 A1 | 2/1991 | (EP) | ............... | F16C/33/20 |
| 1163423 | 9/1969 | (GB) | ............... | B29D/3/00 |
| 2 166 142 A | 4/1986 | (GB) | ............... | F16C/33/20 |
| 2 274 844 A | 8/1994 | (GB) | ............... | C08L/27/18 |
| 2 279 998 A | 1/1995 | (GB) | ............... | F16C/33/20 |

OTHER PUBLICATIONS

International Search report, PCT/GB97/02846.

* cited by examiner

Primary Examiner—S. Thomas Hughes
Assistant Examiner—Marc Butler
(74) Attorney, Agent, or Firm—Rader, Fishman & Grauer PLLC

(57) ABSTRACT

A method of forming a bearing includes adding at least one particulate material to an aqueous dispersion of polytetrafluoroethylene, mixing the constituents to allow the polytetrafluoroethylene to coagulate to form a mush, spreading the mush on to a support, and curing the mush to form a bearing lining layer on the support. The method is characterized in that the partiulate material is in the form of an aqueous colloidal dispersion including small particles and in that the small particles of the particulate material itself cause coagulation of the polytetrafluoroethylene without need for an additional separate coagulant material.

9 Claims, No Drawings

METHOD OF FORMING A BEARING

FIELD OF THE INVENTION

This invention is concerned with a method of forming a bearing of the type which comprises a support on which a bearing lining layer is formed. The bearing then presents a plain surface against which a moving member, eg a rotating shaft, can move.

BACKGROUND OF THE INVENTION

A conventional method (see for example GB 2 279 998 A) of forming a bearing comprises mixing. polytetrafluoroethylene (PTFE) in an aqueous dispersion with a filler, and optionally strengthening fibres and/or other fillers, adding a lubricant to assist in spreading, and adding an aqueous solution of aluminium nitrate or another salt to cause the PTFE to coagulate to form a "mush". The mush is spread on to a support, eg a sintered bronze layer on a steel backing, and is heated to cure the mush to thereby form it into a bearing lining layer on the support. The bearing lining bearings produced by this method are susceptible to cavitation erosion, ie the tendency for lubrication oil used with the bearing to cause cavities in the lining material. Furthermore, this method has the disadvantage that it involves the use of a significant quantity of lubricant which includes a volatile solvent (toluene is commonly used as the lubricant).

SUMMARY OF THE INVENTION

It is an object of the-present invention to provide a method of forming a bearing which results in a bearing with improved cavitation erosion resistance and wear resistance The invention provides a method of forming a bearing comprising adding an aqueous colloidal dispersion of at least one particulate material to an aqueous dispersion of polytetrafluoroethylene, the method also comprising mixing the dispersions for a period sufficient to allow the polytetrafluoroethylene to coagulate to form a mush, spreading the mush on to a support, and curing the mush to form a bearing lining layer on the support.

In a method according to the invention, the aqueous colloidal dispersion contains small particles which cause the PTFE to coagulate without the addition of aluminium nitrate or another salt. It is believed that the small particles act as seeds around which the PTFE coagulates. Furthermore, it is found that the bearing lining material containing small particles has greater cavitation erosion resistance. In addition, it is found that the method can be carried out using no lubricant or significantly less lubricant than the conventional method (eg less than 1% by volume as opposed to about 10%) and non-volatile lubricants, such as polyol-based lubricants, can be used.

In a method according to the invention, the particles of the particulate material preferably have their median dimension between 1 nanometer and 100 nanometers. Most preferably, the median dimension is between 5 nanometers and 30 nanometers. The particulate material may be selected from the group consisting of metals, metal oxides, metal sulphides, metal fluorides, metal carbonates, metal phosphates and silica. Possibilities include oxides of aluminium, tin, titanium, iron, zinc, copper and lead, metals such as iron, tin, nickel chromium, copper and zinc, sulphides of cadmium, iron, lead, copper and zinc, cadmium carbonate, calcium fluoride, and phosphates of aluminium, cobalt and iron.

In order to increase the strength or other properties, of the bearing lining material, additional fillers may be included in the aqueous dispersion of polytetrafluoroethylene, eg non-colloidal calcium fluoride, fibres of glass or aramid, or lead.

The invention also provides a bearing formed by a method according to the invention, comprising a support which comprises a sintered bronze support, the bearing also comprising a lining layer which is impregnated into the support and stands proud thereof, the lining layer comprising polytetrafluoroethylene in which particulate material is dispersed, characterised in that the particulate material has a median particle dimension of between 1 nanometer and 100 nanometers. The particulate material is preferably alumina.

There now follows a detailed description of an illustrative example in accordance with the invention.

In the illustrative example, one liter of an aqueous dispersion of PTFE was mixed with 20 ml of a pigment for 5 minutes in a Kenwood mixer. To this dispersion, 20 ml of a non-volatile polyol-based lubricant was added and the mixture was mixed for a further two minutes. Then, 300 ml of an alumina colloid (20% w/v) was added and mixed for 15 minutes. The alumina colloid contained alumina particles having a median dimension of 20 nanometers. Coagulation of the PTFE occurred during this 15 minute period. The resultant polymer "mush" was then left to stand for 30 minutes before being applied to a support which was formed of sintered bronze mounted on a steel backing. The mush composition was: PTFE 86.1% v/v, alumina 7.2% v/v, and lubricant 6.7% v/v.

The mush was rolled on to the sintered bronze support using a twin rolling mill thereby impregnating the mush into the porosity of the sintered support. The rolling continued until the mush stood proud of the support by 25 to 30 microns. The mush was then cured at 360° C. for 4.5 minutes.

Samples made by the illustrative example were tested under lubricated conditions (strut oil) in a cavitation erosion test rig for 60 minutes. The samples were flat and 40 mm×40 mm. The cavitation erosion damage was induced using a vibrating amplifying horn operating at an amplitude of 15 microns and a 1 mm separation. At the end of the test, it was found that the samples did not have the bronze sinter exposed at all, ie the lining layer had not been completely removed anywhere. The test-was repeated using samples made by the conventional method referred to above. In all cases, at least 10% of the lining layer had been removed exposing the sintered support layer and, in some cases, as much as 50% was exposed.

DETAILED DESCRIPTION OF THE INVENTION

A sample of the bearing made by the illustrative example was tested for wear resistance under non-lubricated conditions using a Halley test rig. In this test, a stainless steel roller was rotated against a flat sample for 24 hours. The volume of material removed from the sample was recorded as 0.22 $mm^3$ and also a final width of the wear scar formed by the roller was measured. The results showed that both the volume of material removed (0.53 $mm^3$) and the wear scar width were higher for bearings made by the conventional method described above.

The dynamic coefficient of friction measured under dry conditions for the samples made by the illustrative example was found to be 0.09 as opposed to the 0.1 measured for pure PTFE.

In a variation of the illustrative method, the lubricant was omitted entirely and the quantity of alumina colloid was reduced to 150 ml. It was still found to be possible to make satisfactory bearings. In another variation still with 150 ml of alumina colloid, the quantity of lubricant was 0.5 to 2 ml (still the polyol-based lubricant). The bearings were satisfactory and spreadability of the mush was improved.

What is claimed is:

1. A method of forming a bearing comprising adding at least one particulate material to an aqueous dispersion of polytetrafluoroethylene, mixing the constituents to allow the polytetrafluoroethylene to coagulate to form a mush, spreading the mush on to a support, and curing the mush to form a bearing lining layer on the support, the method being characterized in that said particulate material is in the form of an aqueous colloidal dispersion comprising small particles and in that the small particles of the particulate material itself cause coagulation of the polytetrafluoroethylene without need for an additional separate coagulant material.

2. A method according to claim 1, characterized in that the particles of the particulate material have their median dimension between 1 nanometer and 100 nanometers.

3. A method according to claim 2, characterized in that the median dimension is between 5 nanometers and 30 nanometers.

4. A method according to claim 1, characterized in that additional fillers are included in the aqueous dispersion of polytetrafluoroethylene.

5. A method according to claim 4 wherein the additional fillers are selected from at lease one of the group comprising: non-colloidal calcium fluoride; fibers of glass or aramid; and lead.

6. A method according to claim 1 wherein a lubricant is added to the mixture.

7. A method according to claim 6 wherein the lubricant is less than 1% by volume.

8. A method according to claim 6 wherein the lubricant is non-volatile.

9. A method according to claim 6 wherein the lubricant is a polyol-based lubricant.

* * * * *

UNITED STATES PATENT AND TRADEMARK OFFICE
CERTIFICATE OF CORRECTION

PATENT NO. : 6,289,590 B1
DATED : September 18, 2001
INVENTOR(S) : Julie Ann McDonald It is certified that error appears in the above-identified patent and that said Letters Patent is hereby corrected as shown below:

<u>Column 3,</u>
Line 15, replace "ticles and in that"
with -- ticles selected from the group consisting essentially of metals, metal oxides, metal sulphides, metal fluorides, metal carbonates, metal phosphates and silica and in that --

<u>Column 4,</u>
Line 5, replace "additional fillers are included in" with -- a filler is added to --
Lines 7, 8 and 9, replace "additional fillers are selected from at lease one of the group comprising: non-colloidal calcium fluoride; fibers of glass or aramid; and" with -- fillers are selected from the group consisting essentially of non-colloidal calcium fluoride, fibers of glass or arimid, and --

Signed and Sealed this

Twenty-fifth Day of June, 2002

*Attest:*

*Attesting Officer*

JAMES E. ROGAN
*Director of the United States Patent and Trademark Office*